United States Patent
Simmons, Jr. et al.

(10) Patent No.: US 9,346,577 B2
(45) Date of Patent: May 24, 2016

(54) PACKAGING MACHINE

(75) Inventors: James A. Simmons, Jr., Painesville, OH (US); Kenneth A. Javor, Concord Township, OH (US); Walt Ireland, Ellet, OH (US)

(73) Assignee: Heat Seal LLC, Cleveland, OH (US)

( * ) Notice: Subject to any disclaimer, the term of this patent is extended or adjusted under 35 U.S.C. 154(b) by 1075 days.

(21) Appl. No.: 13/382,347

(22) PCT Filed: Jul. 8, 2010

(86) PCT No.: PCT/US2010/041368
§ 371 (c)(1),
(2), (4) Date: Jan. 5, 2012

(87) PCT Pub. No.: WO2011/005958
PCT Pub. Date: Jan. 13, 2011

(65) Prior Publication Data
US 2012/0102877 A1   May 3, 2012

Related U.S. Application Data

(60) Provisional application No. 61/223,761, filed on Jul. 8, 2009.

(51) Int. Cl.
*B65B 67/00* (2006.01)
*B65B 67/10* (2006.01)
(Continued)

(52) U.S. Cl.
CPC ............. *B65B 51/148* (2013.01); *B65B 67/10* (2013.01); *B65B 2051/105* (2013.01)

(58) Field of Classification Search
CPC ........ B65B 11/00; B65B 11/02; B65B 51/10; B65B 51/14; B65B 51/148; B65B 205/105; B65B 67/10; B65B 2051/105; B65B 67/08

USPC .......... 53/52, 75, 76, 493, 495, 498, 218, 219
See application file for complete search history.

(56) References Cited

U.S. PATENT DOCUMENTS 2,668,403 A    2/1954  Rumsey, Jr.
3,040,161 A *  6/1962  Bremer et al. ........... 219/448.16
(Continued)

OTHER PUBLICATIONS

PCT/US2010/041368 International Search Report and Written Opinion; date of mailing Aug. 31, 2010.

*Primary Examiner* — Andrew M Tecco
(74) *Attorney, Agent, or Firm* — Tarolli,, Sundheim, Covell & Tummino LLP

(57) ABSTRACT

A packaging machine of the type that is used to hand-wrap a package with a stretchable film that is heat-fused/sealed. The machine includes a supply of film for wrapping a package and a hot plate mechanism for heat fusing the film after the package is wrapped. The hot plate mechanism includes a fever arm that moves a sealing platform from a raised position to a lowered, heat sealing position when the package is placed on the platform. A control circuit energizes a heating element forming part of the sealing platform and causes it to reach a desired heating temperature in 2 to 4 seconds, whereby fusing of the sealing film is achieved. An interval timer is used to control a signaling device such as a light to Indicate the machine is in a heating cycle. A separate timer, in conjunction with a temperature sensing thermistor, controls a length of time the heating element is energized and terminates power to the heating element prior to the end of a sealing Interval if a predetermined temperature is exceeded. The sealing intervals are selectable by the operator using a multi-positioned switch which connects selected timing resistors to the interval timers. Power to the heating element is only delivered to the heating element during a heating cycle, thus conserving electrical power.

17 Claims, 9 Drawing Sheets

(51) Int. Cl.
  *B65B 51/14* (2006.01)
  *B65B 51/10* (2006.01)

(56) References Cited

U.S. PATENT DOCUMENTS

| | | | | |
|---|---|---|---|---|
| 3,176,443 A | * | 4/1965 | Klamp | 53/390 |
| 3,697,728 A | * | 10/1972 | Stirzenbecher | 219/548 |
| 4,017,713 A | * | 4/1977 | Lodi | 219/243 |
| 4,223,511 A | * | 9/1980 | Black | 53/390 |
| 4,257,212 A | * | 3/1981 | Havens | 53/463 |
| 4,366,366 A | | 12/1982 | Ekblad | |
| 4,524,559 A | * | 6/1985 | Ikemoto | 53/219 |
| 4,568,818 A | * | 2/1986 | Ikemoto | 219/221 |
| 4,670,282 A | | 6/1987 | Onishi et al. | |
| 4,748,795 A | * | 6/1988 | Gibson | 53/390 |
| 5,940,579 A | * | 8/1999 | Kallgren et al. | 392/433 |
| 6,088,996 A | * | 7/2000 | Maruyama | 53/373.7 |
| 6,296,894 B1 | * | 10/2001 | Tanabe et al. | 427/8 |
| 6,805,312 B2 | | 10/2004 | Capp | |
| 7,067,772 B2 | | 6/2006 | Tanner et al. | |
| 7,075,040 B2 | | 7/2006 | McFadden et al. | |
| 7,287,386 B2 | | 10/2007 | Upadhye et al. | |
| 7,420,142 B2 | | 9/2008 | Barrena et al. | |
| 7,554,084 B2 | | 6/2009 | Mok et al. | |

\* cited by examiner

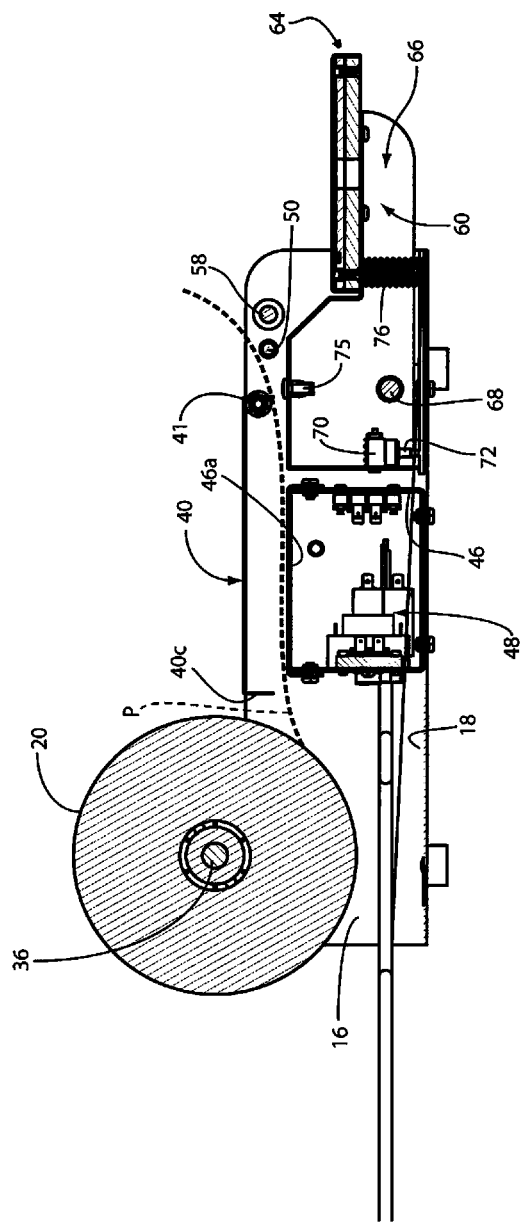

PACKAGING MACHINE

CROSS REFERENCES TO RELATED APPLICATIONS

This application filed under 35 U.S.C §371 is a national phase application of International Application Serial Number PCT/US2010/041368 filed Jul. 8, 2010, which claims priority to U.S. Provisional Application 61/223,761, filed. Jul. 8, 2009.

TECHNICAL FIELD

The present invention relates generally to packaging systems, and, in particular, to a new and improved package wrapping machine.

BACKGROUND ART

Packaging machines of the type that are used to hand-wrap packages with a thin, often clear film, are often used in supermarkets to wrap meat, cheese, etc. In a typical machine, a foam tray on which the meat or cheese is placed is hand-wrapped with a length of stretchable film that is dispensed from a roll on the wrapping machine. Once wrapped, the film is severed and the edges of the sheet are folded and tucked on the underside of the package. Heat is then used to fuse the film, thus sealing the package. In a typical machine, a hot plate surface is provided which is heated to a predetermined temperature that is related to the temperature needed to cause melting or fusion of the film used to wrap the package.

DISCLOSURE OF INVENTION

The present invention provides a new and improved packaging machine of the type that is used to hand-wrap a package with a stretchable film. The present invention provides a supply of film for wrapping a package, a means for severing a length of the film and a hot plate surface for effecting fusion and sealing of the film that is wrapped around the package.

In accordance with a feature of the invention, the presence of a package to be sealed is sensed when a package is placed on a of plate mechanism and/or when the hot plate mechanism is depressed by the operator. The sensing of a package triggers a control circuit which energizes a heating element forming part of the hot plate mechanism and which is arranged to reach a predetermined operating temperature in less than ten seconds, preferably in 2 to 4 seconds.

According to another feature of the invention, the heating element is only energized for a predetermined interval of time whenever a package to be sealed is set on it. As a result, substantial electrical power is conserved since the heating element is only energized when a package to be sealed is present and only for a predetermined length of time.

In the preferred and illustrated embodiment, a hot plate subassembly is provided that includes a heated platform that is pivotally attached to a base by a lever arm. In the illustrated embodiment, a biasing spring urges the heated platform to a raised position. A position sensor, i.e., a micro-switch, changes state when the platform moves from its raised position to a package sealing position.

The change in state detected by the micro-switch activates a timer circuit that energizes a heating element forming part of the hot plate platform in order to provide heat for sealing/fusing the packaging film.

According to a preferred embodiment, the length of time during which the heating element is energized, is determined by an interval timer having a predetermined time-out interval and which is also connected to a temperature sensor. In the illustrated embodiment, a time-out interval is controlled by an external resistor (which may be selectable by the operator), and the thermistor that monitors the temperature of the heating element.

When a package to be sealed is placed on the platform, downward movement of the platform causes the micro-switch to change state and apply power to the hot plate interval timer. If the heating element does not exceed a predetermined temperature during the sealing cycle, the heating element will be energized for the full cycle time determined by the selected resistance. However, if the desired temperature is reached prior to the end of the sealing cycle, the thermistor (which monitors the temperature of the heating element) will cause the timer to immediately time-out and interrupt power to the heating element.

According to another feature of the invention, a separate interval timer is used to activate a light indicator (or other signaling device, such as a buzzer) in order to provide a visual means to an operator that the machine is in a heat sealing cycle. With this arrangement, the indicator light remains illuminated for the full sealing time, even though power to the heating element may have been interrupted because it reached its maximum operating temperature. With this arrangement, the package being sealed will not be inadvertently removed from the platform prior to full sealing of the packaging film.

According to a further feature of the invention, the hot plate subassembly is pivotally attached to a sub base which, in turn, is fixed to a machine base. An axle rotatably supported by flange bushings in the lever arm are secured to upturned flanges formed in the sub base.

According to another feature of the invention, the sealing times are selectable by the operator and in the illustrated embodiment are provided by a multi-positioned switch which connects selected resistors to appropriate terminals on the interval timers. The selected resistors determine the amount of time a given timer will connect power to its associated device.

Additional features of the invention will become apparent and a fuller understanding obtained by reading the following detailed description made in conjunction with the accompanying drawings.

BRIEF DESCRIPTION OF DRAWINGS

FIG. 2 is a sectional view through the center of the machine shown in FIG. 1A;

BEST MODE FOR CARRYING OUT THE INVENTION

Figure 1A:
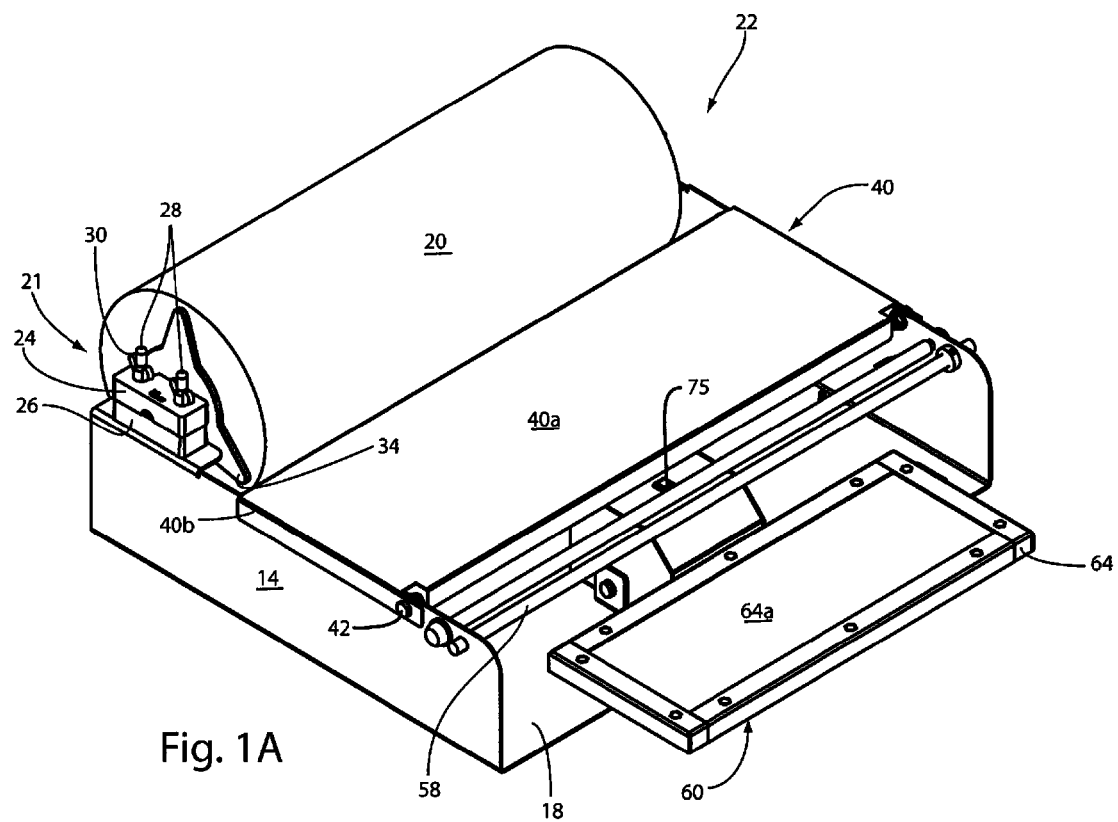
FIG. 1A is an isometric view of a wrapping machine constructed in accordance with a preferred embodiment of the invention.
Figure 1B:
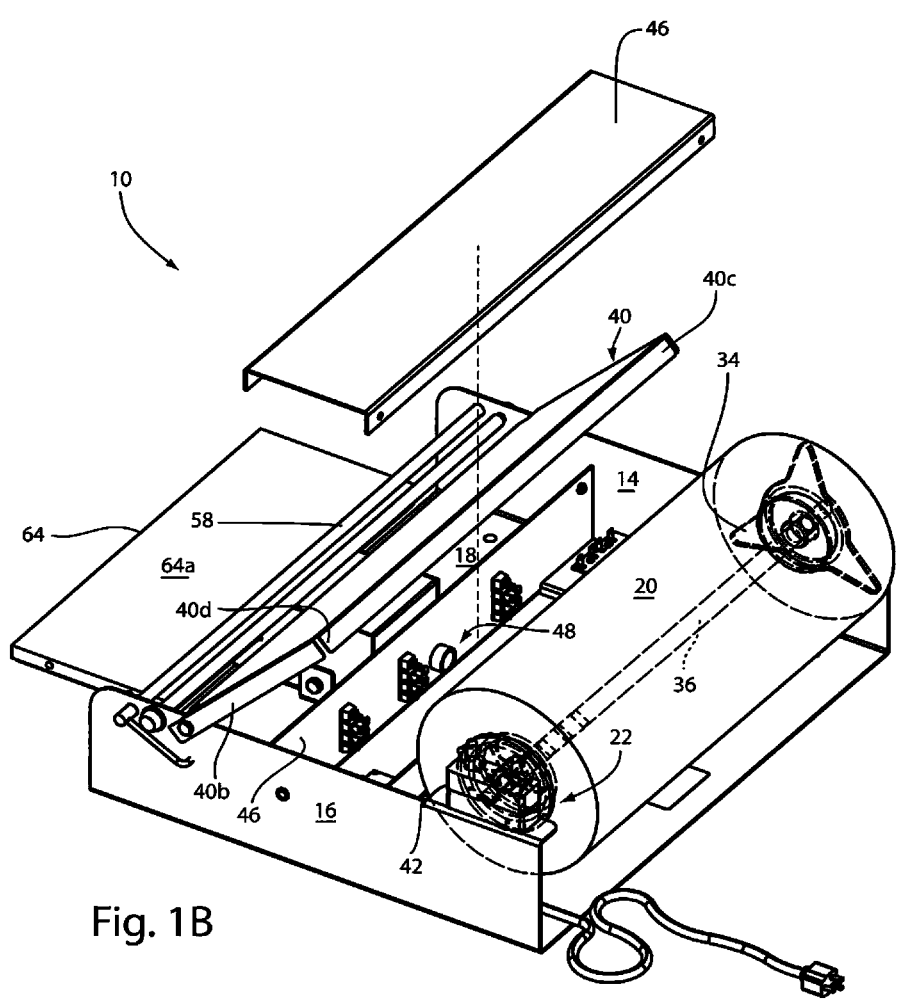
FIG. 1B is an exploded view of the machine shown in FIG. 1A.

FIGS. 1A, 1B illustrate a wrapping machine constructed in accordance with a preferred embodiment of the invention. As is known, this type of machine is used to wrap packages with a stretchable, heat sensitive film. Once the package is wrapped, heat is used to fuse the wrapping in order to seal the package. This type of machine is often used in supermarkets to package produce, meats, etc.

The illustrated wrapping machine is considered a tabletop machine. It should be understood, however, that the principles of this invention, to be described, are equally applicable to floor and self-standing wrapping machines.

As seen best in FIG. 1B, the machine includes a frame indicated generally by the reference character 10 that comprises a pair of side plates 14, 16 and base 18. In the preferred embodiment, the frame is made from aluminum and is formed from a single sheet of material formed into the U-shape shown in FIG. 1B.

A roll of stretchable packaging film 20 is supported for rotation by a pair of supports indicated generally by the reference characters 21, 22 (see FIG. 1A). In the illustrated embodiment, each support comprises a pair of support blocks 24, 26 that are clamped together by a pair of threaded studs or screws 28 and associated wing fasteners 30. The roll 20 itself is mounted to a reusable roll support that comprises end pieces or flanges 34 and an axle 36. The ends of the axle 36 are removably captured between the support blocks 24, 26. When the supply of wrapping material is exhausted, the roll support is removed from the machine by removing the wing nuts 30 to enable the upper support block 24 to be removed. This releases the ends of the axle 36 and allows the operator to install a fresh supply of wrapping material or film.

A pivotally mounted plate or bridge 48 defines a wrapping surface 40a upon which a package is wrapped with film from the supply 20. The bridge 40 includes a pair of downwardly depending end flanges 40b which overlie the outer, upper edge surfaces of the side plates 14, 16 and a rigidizing back flange 40c. Gaps 41d provide clearance for the upper edge of the side plates 14, 16. This construction provides support for the bridge when rotated into its horizontal position shown in FIG. 1A. The bridge 40 can be pivoted upwardly about a pivot 42 to expose the inside of the machine including its electrical box 46. As seen best in FIG. 2, a cover plate 46a encloses the electrical components housed within the box 46. The cover 46a covers a compartment 48 which houses circuitry and other components necessary for the operation of the machine.

The wrapping material is dispensed from the roll 20 along the path P. The material is guided by the cover 43a and emerges through an opening defined between the front edge 41 of the bridge 40 and a retainer rod 50. In the preferred and illustrated embodiment, the retainer rod 50 is covered with a coating, i.e., vinyl, to which the wrapping material releasably adheres so that the end of the material is maintained and positioned for easy grasping by the operator. The cover 40 is pivoted upwardly (as viewed in FIG. 2) to expose the feed path and facilitate feeding of the wrapping material.

The package to be wrapped is pieced on the bridge 40 and a suitable length of film material is pulled from the supply by the operator. The operator then hand wraps the material around the package.

When the wrapping material fully encompasses the package, the portion of the wrapping surrounding the package is severed from the rest of the web by preferably contacting a heated rod 58. Since the material is heat sensitive, contact with the heated rod cause severance of the material.

In general, once the wrapped package is severed from the rest of the web, the wrapping is gathered, tucked or folded underneath the package. According to the invention, the side of the package with the gathered/folded material is placed upon a hot plate subassembly indicated generally by the reference character 60 which includes a heated hot plate 64. The heat from the hot plate 64 causes fusion of the material and, hence, seals the package.

Figure 3:
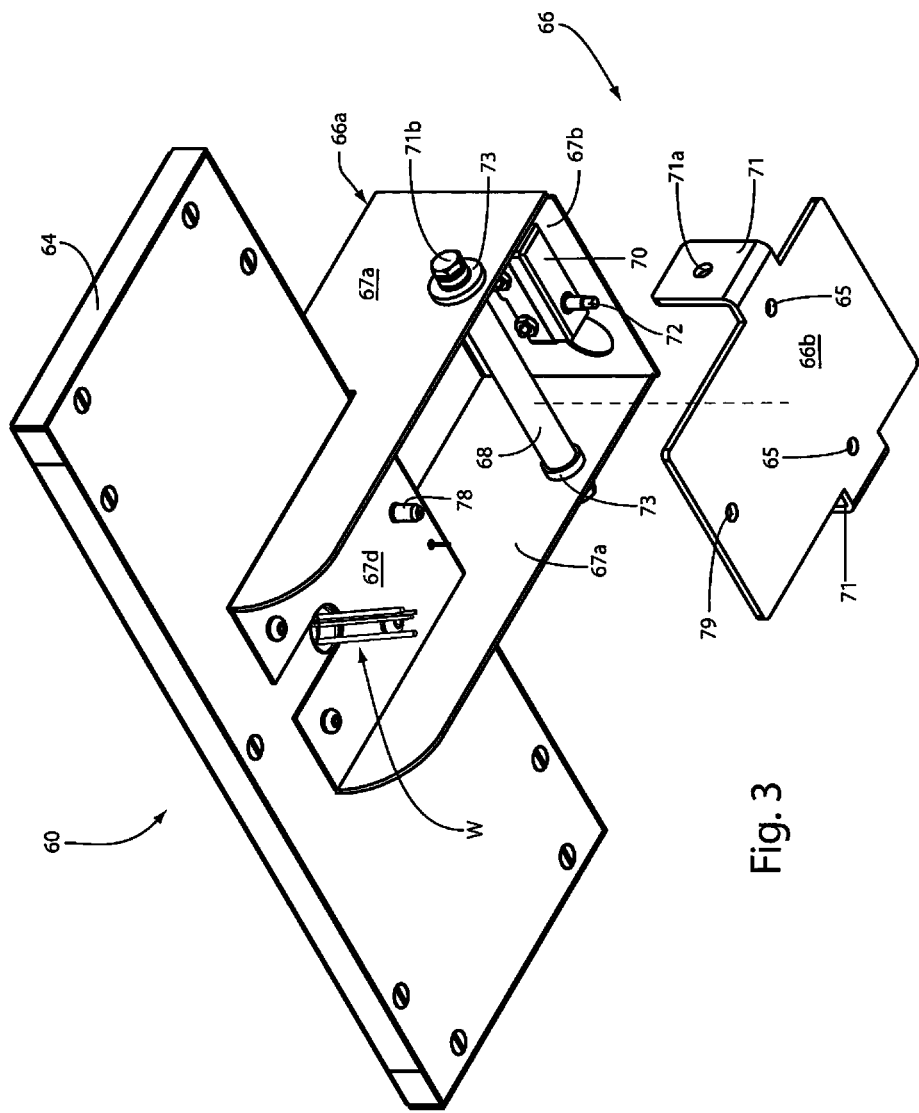
FIG. 3 is a perspective view of a hot plate mechanism constructed in accordance with the preferred embodiment of the invention.
Figure 4:
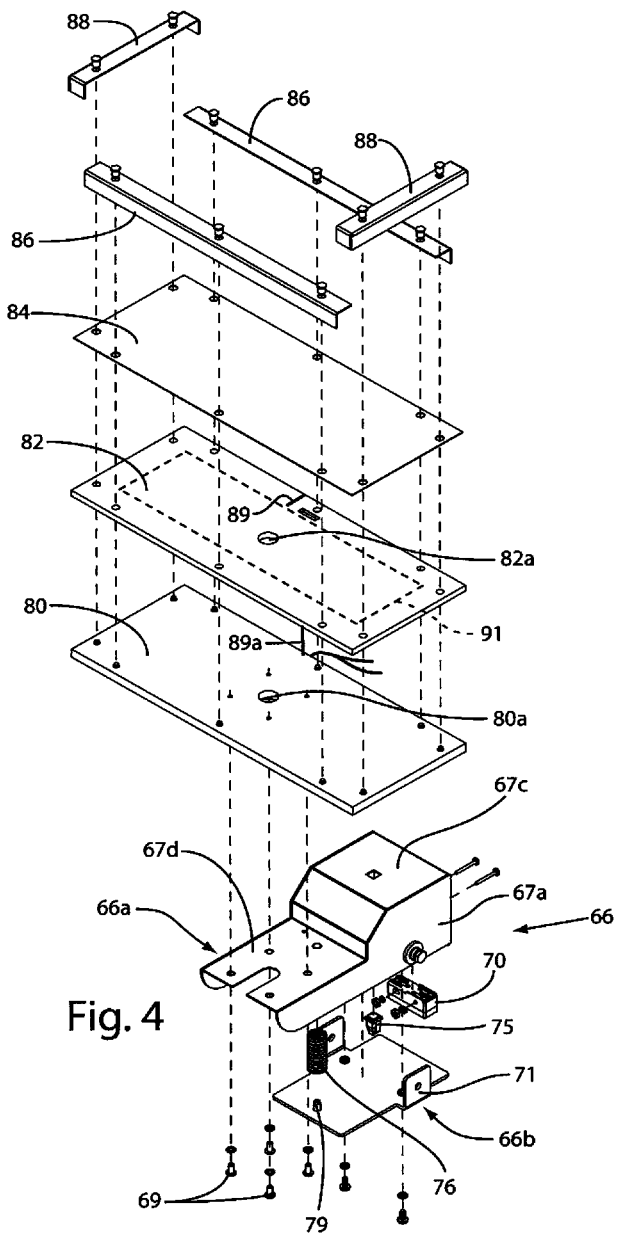
FIG. 4 is an exploded view of the hot plate mechanism shown in FIG. 3.

According to the invention, the hot plate 64 is not energized or heated until a package is placed on its sealing surface 64a. According to the preferred embodiment and, as best seen in FIGS. 2 and 3, the hot plate or heated platform 64 is pivotally attached to the base 18 by a lever arm assembly 66 which includes a lever arm 66a and a sub-base 66b. The lever arm 66a is best shown in FIG. 4 and includes a pair of side plates 67a, a rear plate 67b, a top plate 67c and a support plate 67d to which the hot plate 64 is attached by a plurality of fasteners 69. The lever arm 66a mounts an axle 68 which, as seen in FIG. 3, includes ends that extend beyond the side plates 67a. The sub-base 66b includes a plurality of mounting holes 65 by which the sub-base 66b is rigidly attached to the base 18. The sub-base 66b includes a pair of parallel, upturned flanges 71, which include apertures 71a, by which fasteners 71b are used to secure ends of the axle 68 to the flanges 71 and which thus pivotally support the lever arm 66a. The axle 68 is preferably supported by flanged bushings 73.

In a preferred and illustrated embodiment, and as best seen in FIGS. 1A and 2, an indicator light 75 (i.e., LED) is mounted to the top plate 67c of the lever arm 66a. In the preferred embodiment, the LED is energized to indicate to an operator that the machine is in a heating/sealing cycle.

As seen in FIGS. 2 and 3, the hot plate subassembly 6 includes a micro-switch 70 that is secured to the back plate 67b of the lever arm 66a and which includes an actuating plunger 72. In the illustrated embodiment, when the hot plate subassembly 60 is in its upper position as viewed in FIG. 2, the plunger 72 is depressed by contact with the sub-base 66b. When a package is placed on the hot plate surface 64a, either the pressure of the operator or the weight of the package or both causes the hot plate to move downwardly as viewed in FIG. 2, thereby causing upward movement in the opposite end of the lever arm 66a which, in turn, causes the micro-switch plunger 72 to be released allowing it to move outwardly (downwardly as viewed in FIG. 2). In the preferred embodiment, the hot plate subassembly is biased towards its upper position shown in FIG. 2 by a tension spring 76 that is captured by a lug 78 forming part of the lever arm 66a and a lug 79 secured to the sub-base 66b (shown best in FIGS. 3 and 4).

As is known, the plunger 72 is coupled to normally closed (N/C) and normally opened (N/O) contacts within the micro-switch 70 which open and close, depending on the position of the plunger 72. As will be explained, the micro-switch 70 is used to control the energization of the indicator light 75 and a heating element forming part of the hot plate 64. It should be noted here, that the location of the micro-switch can be varied an may in fact, be positioned further upstream from the hot plate 64 should earlier energization of the hot plate be desired.

Referring to FIG. 4, the details of the hot plate construction are illustrated. In addition to what has already been described, the hot plate 64 includes a base plate 80 which may be fiberglass, a sheet of insulation 82 and a heating element 84, all of which are sandwiched together by a pair of longitudinal frame rails 86 and a pair transverse frame rails 88. In the preferred embodiment, a temperature monitoring thermistor 89 having connection wiring 89a is attached (as by taping) to the insulation sheet 82. In the preferred embodiment, a heat sink pad 91 is provided to buffer the heat generated by the heating element 84. The heat sink pad 91 allows the use of a thinner heating element layer. In the preferred embodiment, the heat sink pad is graphite and this type of material is available from EGC Enterprises, Inc., of Chardon, Ohio. Fasteners, including a plurality of nuts and washers, are used to maintain the assemblage.

As seen best in FIG. 4, the base plate 80 is rigidly fixed to one side of the lever arm 66 by suitable fasteners. The base plate 80 and insulation sheet 82 include respective access holes 80a, 82a through which wiring W (shown in FIG. 3) for the heating element 84 are fed.

According to the invention, the heating element 84 is capable of reaching a desired operating temperature sufficient to provide sealing of the package in less than 10 seconds. This is achieved by utilizing a graphite-based heater and a suitable control circuit. According to the invention, the micro-switch 70 is used to sense the presence of a package on the hot plate 64 i.e. when a package is placed on the hot plate, the resulting downward movement of the lever arm 86 causes the micro-switch to change state. The micro-switch forms part of a power circuit for providing power to the heating element 84 sufficient for it to reach a desired operating temperature within a very short period of time, i.e. 2 to 10 seconds. In the preferred and illustrated embodiment, the heating element 84 is of a rapid, response flexible graphite foil heater, an example of which is available from EGC Enterprises, Inc., of Chardon, Ohio.

The ability for the hot plate to quickly reach the desired temperature is further achieved by reducing the thermal mass of the hot plate 64, thus reducing the thermal time constant for the apparatus. As noted above, the base plate 80 is preferably constructed of fiberglass which has a relatively low mass. In addition, the insulation sheet 82 is also of a low mass material. One such material is sold under the "AEROGELS" brand and is sold by Aspen Aerogels, Inc, of Northborough, Mass., in addition, the heating element 84 is selected to have a low mass as well. In the preferred construction, the relatively low mass of the overall hot plate 64, coupled with the rapid response time of the preferred heating element 84, provides a hot plate with a very rapid response time. In the preferred embodiment, the heater reaches the desired operating temperature from ambient in 2 to 4 seconds.

Figure 5:
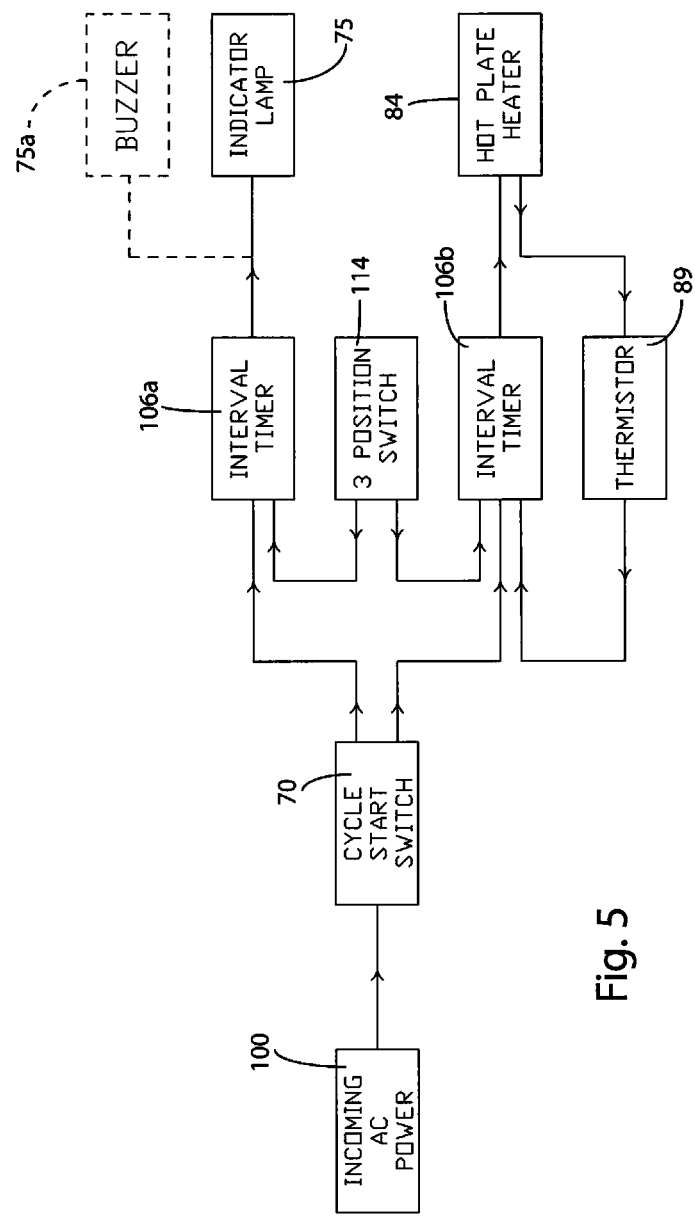
FIG. 5 is a block diagram of the control system for a hot plate heater.

FIG. 5 illustrates a bock diagram of the control system for energizing the hot plate 64. The block 100 represents a source of power, in this case, AC power. AC power is fed to the micro-switch or cycle start switch 70 (the details of which will be described later) and to a pair of interval timers 106a, 106b. In the preferred and illustrated embodiment, the interval timer 106a is a relatively low powered timer, (i.e., 1 amp) and is used to control the energization of the light indicator 75 and/or a signaling buzzer 75a. The interval timer 106b has the capability of controlling significant power, (i.e., 30 amps) and is used to control the energization of the heating element 84.

As seen in FIG. 5, both timers 106a, 106b are initiated by a change of state in the cycle start switch 70 (which is mounted to the lever arm 66a). The length of time that the timers 106a, 106b apply power to their respective devices is determined by external resistors. In the preferred embodiment, a multi-position, rotary or slide switch 114 is used to connect suitable resistances to the timers 106a, 106b. The resistance selected determines, in part, how long a given timer will apply power to its associated device. In the preferred embodiment, the timer 106a energizes the light indicator 75 (and/or the buzzer 75a) for a length of time totally determined by the resistance selected. The interval timer 106b, however, applies power to the hot plate heater 84 as a function of both the resistor selected and the thermistor 89 that monitors the temperature of the heating element. In particular, the resistance selected and connected to the interval timer 106b determines the maximum time that power will be applied to the heating element. However, if the thermistor senses that the desired temperature is reached prior to the time determined by the resistor, the timer 106b will time-out and interrupt power to the heater 84. During periods of heavy usage, the actual time that power is applied to the hot plate heater 84 is substantially shorter than the heating cycle time determined by a given resistor. It should be noted, that because the indicator light 75 is controlled by an independent timer, the sealing time, as observed by the operator by virtue of the indicator light, remains unchanged, even though power to the hot plate heater may be terminated. As a result, consistent sealing of packages is assured, as compared to a circuit in which an indicator light is only illuminated when power to the hot plate 84 is applied.

Figure 6:
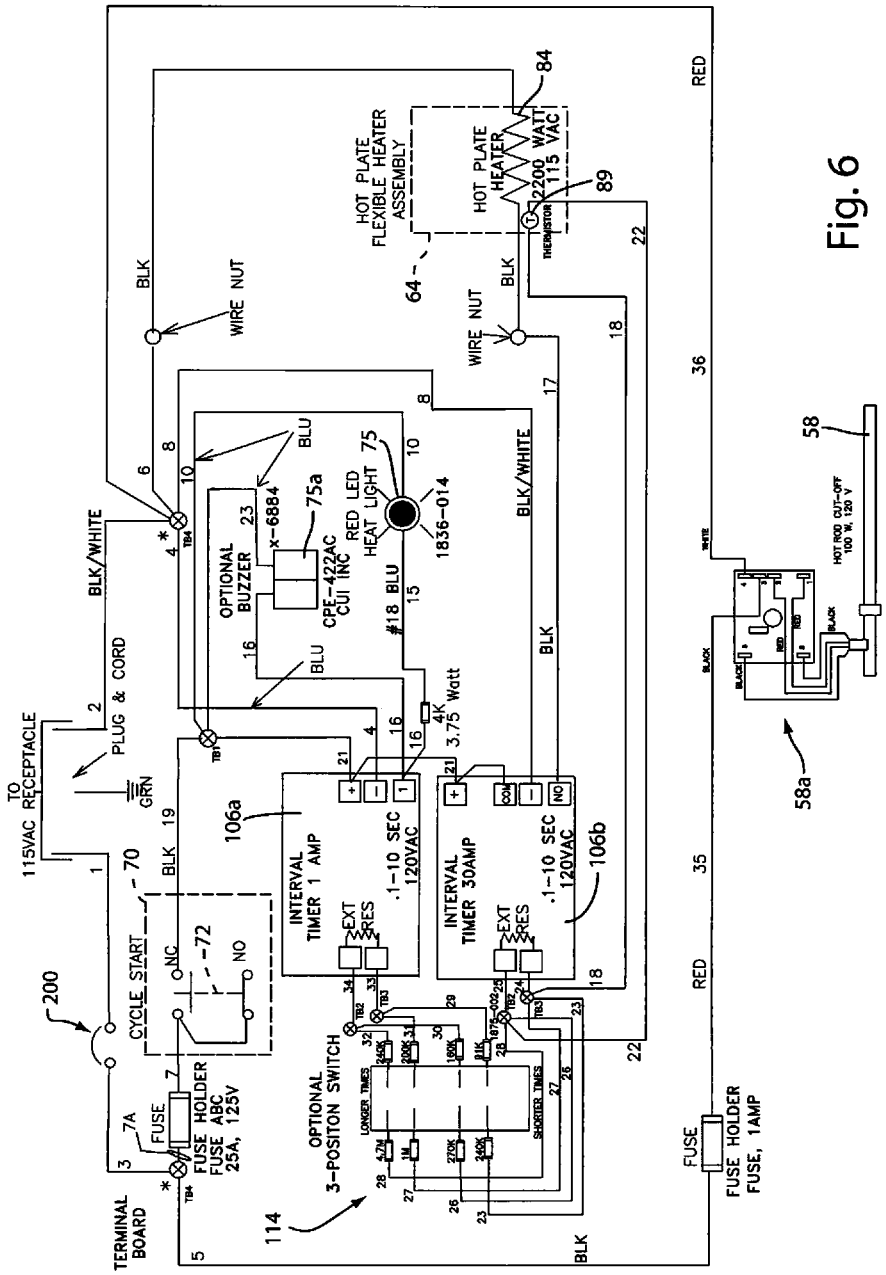
FIG. 6 is a schematic of a circuit that controls the heating of the hot plate shown in FIG. 3, as well as a rod for severing the packaging film from a supply roll.

FIG. 6 is a schematic for a control circuit for the hot plate heater. In the illustrated embodiment, the circuit is powered from a 115 volt AC receptacle. The circuit includes a power switch 200 which, when dosed, provides power to the heated rod cutter element 58 (shown in FIG. 1A), and the micro-switch 70 (also termed cycle start switch). As seen in FIG. 6, the temperature of the cutter element 58 is controlled by a conventional circuit carried on a circuit board 58a, which is supplied by TUTCO Inc. of Cookeville, Tenn. The switched leg of the AC power is connected to the cycle switch 70, the hot rod cutter circuit 58a, and one side of a heat indicating light 75. The micro-switch 70 forming part of the hot plate platform and seen best in FIG. 3 is represented in the schematic by the double pole switch 70 termed a cycle start switch in FIG. 6. It is shown with the normally open (N/O) contacts closed because when the platform is in the upper position, the plunger 72 is depressed which opens the normally closed (N/C) contacts and closes the normally open contacts. When the platform is moved downwardly by placement of the package on the heating surface 64a, the state of the switch 70 changes so that the normally open contacts open and the normally closed contacts close. The closure of the normally closed contacts causes power to be fed to pins 21 (+ pins) of the interval timers 106a, 106b. This change in switch position causes activation of the timers 106a, 106b and causes these timers to apply power to their associated devices, depending on the external resistance connected to a given timer. In the case of the interval timer 106a (which controls the activation of the indicator light 75), a selected external resistance is applied to its terminals 34, 33, the value of the resistance being determined by the position of the switch 114.

In the case of the interval timer 106b (which provides power to the heating element 84), its time-out is determined by the external resistance applied to its associated terminals 25, 24. As seen best in FIG. 6, the actual resistance applied to these terminals is determined by the position of the switch 114, as well as the thermistor 89. The time-out of the interval timer 106b can vary for a given position of the switch 114. The timer interval is also determined by the temperature of the heating element 84 as measured by the thermistor 89. As a result, and especially during heavy usage, the interval of time during which power is applied to the heating element 84 may be substantially shorter than the actual sealing cycle time as indicated by the interval timer 106a.

With the preferred construction, when a package is placed on the hot plate 64, the resulting downward movement of the hot plate causes the micro-switch 70 to deactivate which, in turn, causes the energization of the timers 106a, 106b for a predetermined time determined by the external resistance selected by the switch 114 and the thermistor 89. As indicated above, the indicator light 75 is energized for a predetermined time determined solely by the resistance selected by the switch 114. For the interval timer 106b, the resistance selected by switch 114 determines the maximum time that the heating element 84 will be energized. If a threshold temperature is exceeded during the heating cycle, this excess temperature sensed by the thermistor 89 will cause the timer 106b to time out and interrupt power to the heating element 84.

With the present invention, the heater is only energized when a package is to be sealed. Since the heater is only energized for a predetermined length of time as determined by the rotary or slide switch 114 and thermistor 89, leaving the package on the platform will not cause continuous energization of the heater which could cause overheating, it should be noted here that the rotary or slide switch 114 which is used to connect selected external resistors to the interval timers 106a, 106b be replaced by one or more potentiometers.

It should also be noted that the present invention contemplates a sealing machine that does not have an adjustable sealing time. For this type of machine, fixed resistors may be connected to the suitable terminals of the interval timers 106a, 106b or, alternately, timers having a fixed time interval may be used and, thus, eliminate the need for external resistors. It should also be noted that, in the preferred embodiment, the switch 114 may comprise a three position slide switch available from Switchcraft Inc., of Chicago, Ill., under part number 502-46313LDRX. The thermistor 89 in the preferred embodiment has a resistance of 500 K ohms at 25° C.

Figure 7A:
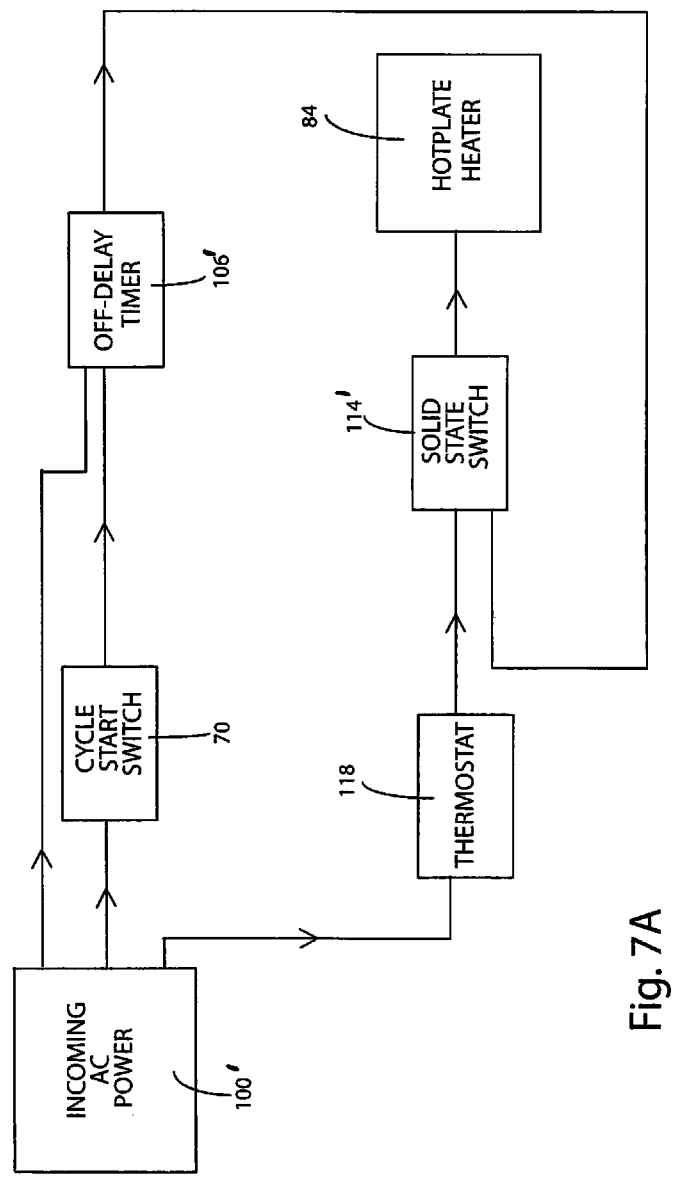
FIG. 7A is a block diagram of an alternate control system for a hot plate heater.

FIG. 7A illustrates a block diagram of an alternate control system for energizing the hot plate 64. The block 100' represents a source of power, in this case, AC power. AC power is fed to the micro-switch or cycle start switch 70 and to an off delay timer 106 which is arranged to energize the not plate heating element 84 for a predetermined interval upon actuation. The communication of power to the hot plate heater is actually controlled by a solid-state switch 114'. In order for the solid state switch to close and provide power to the hot plate heating element 84, it must receive an ON signal from both the of delay timer 106' and from a thermostat 118 (which is also connected to the incoming AC power). In the preferred embodiment the thermostat 118 is attached and forms an integral part of the heating element 84. The thermostat 118 senses an overheat condition and opens to interrupt the signal or power to the solid state switch 114' coming from the power block 100'. As indicated above, if either the signal from the thermostat 118 or from the off delay timer 106' is terminated, the solid-state switch 114' opens to interrupt power to the hot plate heating element 84.

Figure 7B:
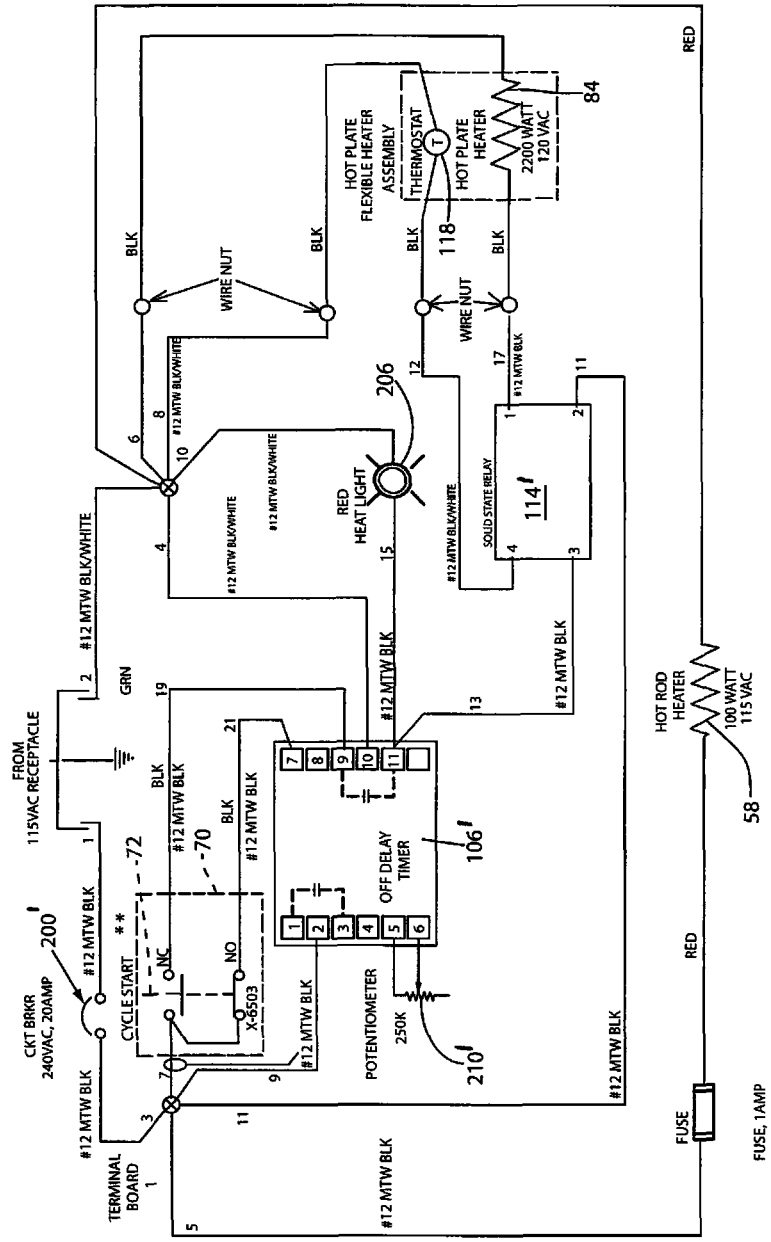
FIG. 7B is a schematic of an alternate circuit for controlling the heating of the hot plate shown in FIG. 3.

FIG. 7B is a schematic for the alternate control circuit for the hot plate heater. In the illustrated embodiment, the circuit is powered from a 115 volt AC receptacle. The circuit includes a power switch 200' which, when closed, provides power to the heated rod cutter element 58 (shown in FIG. 1A), the solid switch relay 114 and one leg of the off delay timer 106'. The switched leg of the AC power is connected to the off delay timer 106, the hot rod cutter 58, one side of a heat indicating light 206, one side of the thermostat 118 and one side of the heating element 84. The micro-switch 70 forming part of the hot plate platform and seen best in FIG. 3 is represented in the schematic by the double pole switch 70. It is shown with the normally open (N/O) contacts closed because when the platform is in the upper position, the plunger 72 is depressed which opens the normally dosed (N/C) contacts and doses the normally open contacts. When the platform is moved downwardly by placement of the package on the heating surface 64a, the state of the switch 70 changes so that the normally open contacts open and the normally closed contacts close. The closure of the normally closed contacts causes power to be fed to pin 9 of the off delay timer 106' and interrupts power to pin 7. This change in switch position causes the off delay timer 106 to send a signal to pin 3 of the solid state relay 114' for a predetermined length of time as determined by the adjustable potentiometer 210' that is connected across pins 5 and 6 of the off delay timer 106'. If the thermostat 118 that forms part of the heating element 84 is closed, the application of the power signal to pin 4 of the solid state relay 114' causes power to be applied to the hot plate heater from pin 1 of the solid state relay 114. When the off delay timer 106' times out the interruption of signal to pin 3 of the solid state relay 114' causes the de-energization of the hot plate heater 64.

It has been found, that with the disclosed construction and the use of the thin film graphite-based heater, continuous heating of the hot plate is not required. It has been found that the application of power to the heating element results in the heater reaching a desired temperature within 2 to 10 seconds, preferably less than 4 seconds. In short, during machine operation power is applied to the heater for only short intervals of time and, as a result, significant power savings can be realized as compared to a package-wrapping machine in which the hot plate is continuously energized.

The invention has been described as forming part of a hand-wrapping machine use in supermarkets. However, the invention has much wider applicability. For example, it can be used in other environments such as laundry wrapping environments. It also may be used as part of automated wrapping machines used in various industries. Accordingly, the present invention should not be limited to wrapping machines of the type found in supermarkets.

Although the invention has been described with a certain degree of particularity, those skilled in the art can make various changes to it without departing from the spirit or scope of the invention as hereinafter claimed.

The invention claimed is:

1. A packaging machine for wrapping a package with a stretchable, heat-sealable film, comprising:
    a) a frame defining a wrapping support surface and a support for a supply of rolled wrapping film accessible by the operator;
    b) a hot plate mechanism including a heated platform attached to said frame and including a heating element for fusing at least a portion of the film that is wrapped around the package when a package is placed on the platform;
    c) a sensor for sensing the presence of a package to be sealed;
    d) a control system for applying power to said heating element in order to provide heat for fusing said film;
    e) said control system including a first timer which is activated upon sensing a package to be sealed and which energizes an indicating device that provides a visual indication to an operator that the machine is in a sealing cycle;
    f) a temperature responsive device for monitoring the temperature of said heating element;
    g) a second interval timer for energizing said heating element for a predetermined length of time, said temperature responsive device communicating with said second interval timer to cause said second interval timer to time-out prior to reaching said predetermined length of time should be exceeded by said heating element such that said heating element is energized for less than said predetermined length of time.

2. The apparatus of claim 1 wherein said heating element is a graphite-based thin film heating element that is capable of reaching a predetermined operating temperature within 2 to 10 seconds of being energized.

3. The apparatus of claim 1 wherein said hot plate mechanism is pivotally connected to said frame and is biased upwardly such that placement of a package on said mechanism causes downward movement of the hot plate, said movement being detected by the sensor comprising a switch attached to said hot plate mechanism.

4. The apparatus of claim 1 wherein said temperature responsive device is a thermistor.

5. The apparatus of claim 1 wherein said temperature responsive device is a thermostat.

6. The apparatus of claim 1 wherein said hot plate mechanism comprises a pivotally mounted lever assembly movable from a rest position to a sealing position, said sensor comprising a micro-switch for monitoring the position of said lever assembly, said micro-switch forming part of said heating circuit.

7. The apparatus of claim 1 wherein the time intervals for said first and second interval timers are operator selectable.

8. The apparatus of claim 7 wherein said time intervals are determined by selectively applying predetermined external resistors to said interval timers.

9. The apparatus of claim 8 wherein said resistances are selected using a multi-positioned switch.

10. The apparatus of claim 1 wherein said heated platform comprises a base plate made from fiberglass, a sheet of insulation and a heating element all of which are arranged in an abutting relationship.

11. The apparatus of claim 1 wherein said hot plate mechanism further includes a lever arm supporting said heated platform, said lever arm being pivotally attached to a sub base.

12. The apparatus of claim 11 wherein said heated platform is biased towards a raised position by a spring acting between said lever arm and said sub base.

13. The apparatus of claim 11 wherein said sensor for sensing the presence of package comprises a micro-switch mounted to said lever arm and including a switch actuator in operative contact with said sub base.

14. The apparatus of claim 1 wherein said indicating device is an LED mounted to said hot plate mechanism.

15. The apparatus of claim 1 wherein said wrapping support surface is provided by a pivotally mounted bridge.

16. The apparatus of claim 1, further comprising a means for severing a length of film used to wrap a package from said supply.

17. A packaging machine for wrapping a package with a stretchable, heat-sealable film, comprising:
a) a frame defining a wrapping support surface and a support for a supply of rolled wrapping film accessible by the operator;
b) a hot plate mechanism including a heated platform attached to said frame and including a heating element for fusing at least a portion of the film that is wrapped around the package when a package is placed on the platform;
c) a sensor for sensing the presence of a package to be sealed;
d) a control system for applying power to said heating element in order to provide heat for fusing said film;
e) said control system including a first timer which is activated upon sensing a package to be sealed and which energizes an indicating device that provides a visual indication to an operator that the machine is in a sealing cycle;
f) a temperature responsive device for monitoring the temperature of said heating element;
g) a second interval timer for energizing said heating element for a predetermined length of time, said predetermined length of time defining a maximum time interval said heating element is to be energized, said temperature responsive device operative to cause said heating element to be de-energized prior to reaching said predetermined length of time should a predetermined temperature be exceeded by said heating element such that said heating element is energized for less than said predetermined length of time.

* * * * *